United States Patent [19]

Gierse et al.

[11] Patent Number: 4,594,796
[45] Date of Patent: Jun. 17, 1986

[54] LINT FILTERING DEVICE OF A CONVECTION DRYING AND/OR FIXING MACHINE

[75] Inventors: Franz-Josef Gierse, Siegen; Heinrich Hermanns, Korschenbroich; Werner Hermes, Tönisvorst; Gerhard Lüpnitz, Monchen-Gladbach; Manfred Pabst, Cologne; Heribert Schlicht, Monchen-Gladbach, all of Fed. Rep. of Germany

[73] Assignee: A. Manforts GmbH & Co., Monchen-Gladbach, Fed. Rep. of Germany

[21] Appl. No.: 658,689

[22] Filed: Oct. 9, 1984

[30] Foreign Application Priority Data

Oct. 6, 1983 [DE] Fed. Rep. of Germany ....... 3336333

[51] Int. Cl.4 ............................................. F26B 13/02
[52] U.S. Cl. ........................................ 34/82; 34/155; 34/158; 55/482
[58] Field of Search .......................... 34/82, 155, 158; 55/422, 481, 482

[56] References Cited

U.S. PATENT DOCUMENTS 2,713,213  7/1955  Bogaty ..................................... 34/82

Primary Examiner—Larry I. Schwartz
Attorney, Agent, or Firm—Herbert L. Lerner; Laurence A. Greenberg

[57] ABSTRACT

A convection drying and/or fixing machine having an interior chamber, includes a lint filtering device disposed in the chamber for treating a textile fabric web, including a component for drying and/or fixing the fabric web, means for circulating air in a heated air stream flowing from the fabric web to the component, a filter screen having a given hole size for protecting the component from lint and other deposits, the filter screen being disposed substantially horizontally in an operating position in the air stream from which the filter screen can be horizontally removed and cleaned, and a protective screen having substantially the given hole size, the protective screen being fixed substantially horizontally in place below or downstream of the operating position of the filter screen and above or upstream of the component to be protected in flow direction of the air stream.

6 Claims, 1 Drawing Figure

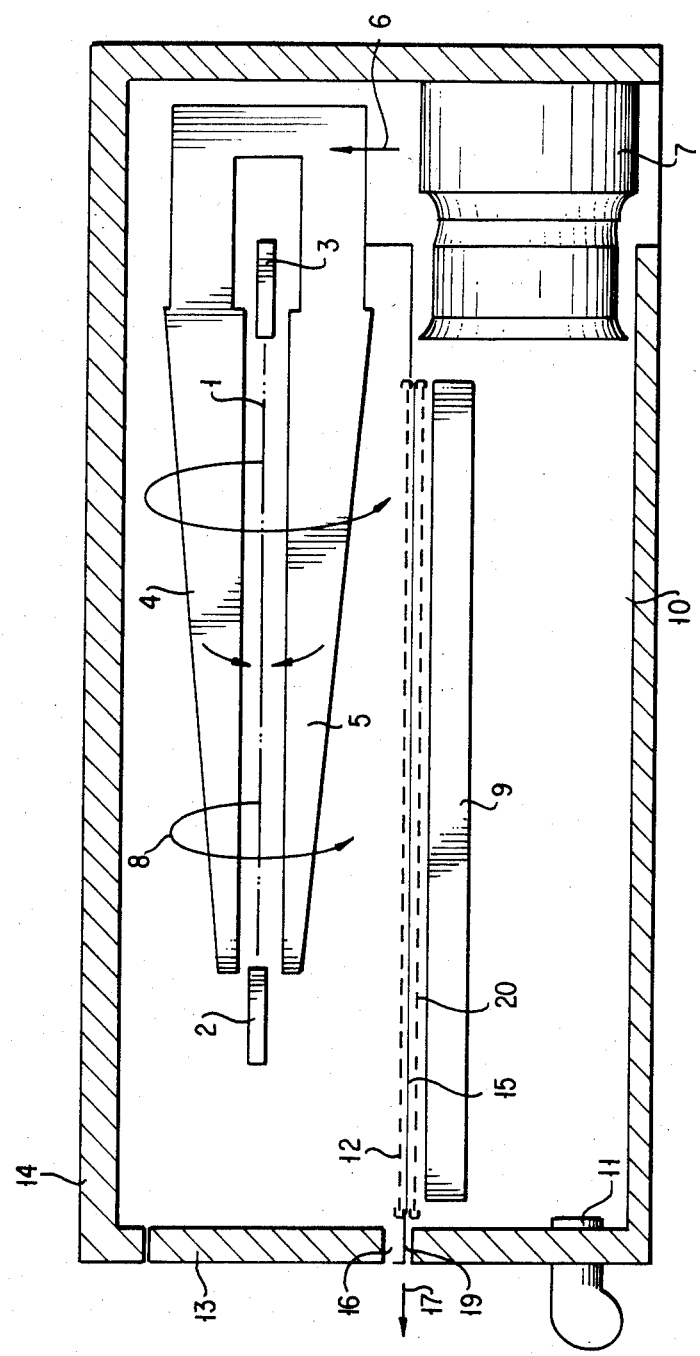

LINT FILTERING DEVICE OF A CONVECTION DRYING AND/OR FIXING MACHINE

The invention relates to a lint filtering device in the interior chamber of a convection drying-and/or fixing machine for treating a textile fabric web with a heated air stream, including a filter screen which can be pulled out horizontally from a working position for preventing lint or similar depositions from entering into a heat exchanger, heating chamber or similar component of the machine. The convection machine for which the invention is intended is preferably a stenter or a loop drying or fixing machine, such as a tentering or stretching frame, a wire cloth or machine band dryer, a hot flow or the like. The term "air stream" includes any treatment gas used in the machines of the above mentioned types.

In convection machines for the continuous drying and/or fixing of textile fabric webs, such as stretching frames, wherein gaseous treatment agents are blown onto the fabric web, usually from both sides, the internal machine parts become less and less accessible as the construction of the machine becomes more compact. This fact is especially disadvantageous due to the regularly required cleaning of the interior of the machine. In order to prevent lint, threads or the like from entering sensitive machine components, such as the heating chamber, or into the heat exchanger, and contaminating these devices, or even causing a fire hazard, filter screens are inserted into the air stream, usually into the return flow from the fabric web, before the air comes in contact with the sensitive components disposed further downstream, such as the heating chamber, heat exchanger and blower.

As the filter screens catch lint and similar deposits, fulfilling their purpose, they represent increasingly growing flow resistance for the gas circulating in the machine. In order to avoid uneconomical stoppages of the machine for cleaning the filter, the filter screens are slidably disposed in horizontal rails in such a manner that they can be pulled out from the interior space in a horizontal direction through slots in the machine wall without stopping the operation, and can be cleaned outside of the machine, or can be replaced by other screens. This cleaning or replacement must be performed very quickly, so as to keep the contamination of the machine components which are to be protected from lint or similar deposits as small as possible. However, the components of the machine are contaminated during the time that the filter screen is out of the machine.

It is accordingly an object of the invention to provide a lint filtering device of a convection drying and/or fixing machine, which overcomes the hereinafore-mentioned disadvantages of the heretofore-known devices of this general type, and to improve the above-described protective devices for preventing lint and similar materials from entering the heat exchanger, heating chamber or similar component inside of the machine, so that even during the cleaning of the main filter screen which can be pulled out from its working position horizontally, the machine parts which are to be protected cannot become contaminated.

With the foregoing and other objects in view there is provided, in accordance with the invention, a convection drying and/or fixing machine having an interior chamber, comprising a lint, fluff or thread end filtering device disposed in the chamber for treating a textile fabric web, including a component for drying and/or fixing the fabric web, means for circulating air in a heated air stream flowing from the fabric web to the component, a filter screen having a given hole size for protecting the component from lint and other deposits, the filter screen being disposed substantially horizontally in an operating position in the air stream from which the filter screen can be horizontally removed and cleaned, and a protective screen having substantially the given hole size, the protective screen being fixed substantially horizontally in place below or downstream of the operating position of the filter screen and above or upstream of the component to be protected in flow direction of the air stream.

In accordance with a concomitant feature of the invention, the component is a heat exchanger or heating chamber.

The installation of the protective screen according to the invention results in reliable protection for the components which are disposed in the air stream downstream of the filter screen which can be laterally removed from the machine during the time that the filter screen is being exchanged. Since the cleaning or exchange of the filter screen is a relatively fast operation, no build up of contamination worth mentioning collects on the protective screen. Consequently, the protecting or auxiliary screen need only be freed of deposits during a basic general cleaning of the machine. Preferably, the auxiliary screen is disposed in the machine in such a way that it remains fixed in its position when the main filter screen is exchanged, but can be easily cleaned when the machine is not operating during a general overhaul, and in particular, so that it can be lifted from its working position for this purpose.

Other features which are considered as characteristic for the invention are set forth in the appended claims.

Although the invention is illustrated and described herein as embodied in a lint filtering device of a convection drying and/or fixing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single figure of the drawing which is a diagrammatic cross-sectional view of the device according to the invention, used in a stenter or tentering or stretching frame.

Referring now to the drawing in detail, it is seen that it represents a vertical-sectional view perpendicular to the longitudinal direction of the stenter frame. During the operation of the machine a fabric web 1 is held in chains 2 and 3 at the longitudinal edges thereof, and is moved in a direction perpendicular to the plane of the drawing between nozzle boxes 4 and 5. During this movement, the web is treated with a gas, in particular with heated air, from the top and bottom. The gas is supplied by a blower 7 along the direction of an arrow 6. The gas flows back from the fabric web 1 in the direction of an arrow 8 and at least the greater portion of the gas is again sucked in by the blower 7 and blown onto the fabric web 1 again in a closed loop. If the treatment gas is to be heated in the illustrated embodiment, the gas is conducted from the web 1 to the blower 7 through a heat exchanger 9, or through a heating chamber 10 which may be heated directly by a gas heater 11, for example.

During the treatment of the fabric web 1 with jets of gas, lint, threads or thread ends, fluff and similar materials may drop off. Therefore, a filter screen or gauge filter 12 is usually inserted into the returning gas stream which flows along the direction of the arrow 8. In order to make it possible to clean this filter while the machine continues to operate, i.e. without opening a door 13 placed in a housing 14 of the machine, the machine is constructed in such a way that the filter 12 is guided in side rails 15. The filter 12 can be pulled out in the horizontal direction indicated by an arrow 17 through a slot 16 formed in the wall 14 of the machine housing, so that the filter can be exchanged or cleaned. For this purpose, it is practical to provide the filter with a frame. An edge 19 of the frame essentially closes the slot 16. During the exchange procedure or during cleaning of the filter screen 12, it is possible for the machine components 9, 10 or 11 which are disposed in the air stream downstream of the working position of the filter, to become contaminated, although only to a small degree. Therefore, a protective screen 20 is inserted into the machine below the location of the laterally slideable filter 12, in such a way that it does not present any air resistance worth mentioning to the gas flow circulating in the machine, and can take over the function of the actual main filter screen during the short time span required for exchanging or cleaning the main filter. Accordingly, the size of the holes of the protective screen 20 should be approximately the same, or slightly larger than, the size of the holes of the main filter screen 12.

When the filter 12 is pulled out from its operating position in the direction 17, the protective screen 20 not only takes over the function of filter 12, but the protective screen 20 also catches deposits which may have been dropped while the filter is withdrawn, so that the cleaning operation is simplified, and special measures are not required. Obviously, the protective screen 20 also must be cleaned periodically.

However, this can be done during the general maintenance operation which the machine requires, when the system is not working and the doors 13 are open.

The foregoing is a description corresponding in substance to German Application P No. 33 36 333.1, dated Oct. 6, 1983, the International priority of which is being claimed for the instant application, and which is hereby made part of this application. Any material discrepancies between the foregoing specification and the aforementioned corresponding German application are to be resolved in favor of the latter.

We claim:

1. In a convection drying and/or fixing machine having an interior chamber, the improvement comprising a lint filtering device disposed in the chamber for treating a textile fabric web, including a component for drying and/or fixing the fabric web, for circulating air in a heated air stream flowing from the fabric web to said component, a filter screen having a given hole size for protecting said component from lint and other deposits, said filter screen being disposed substantially horizontally in an operating position in said air stream from which said filter screen can be horizontally removed and cleaned, a protective screen having a substantially said given hole size, and means for holding said protective screen substantially horizontally in place below said filter screen and above said component to be protected during normal operation of the machine.

2. Device according to claim 1, wherein said component is a heat exchanger.

3. Device according to claim 1, wherein said component is a heating chamber.

4. In a convection drying and/or fixing machine having an interior chamber, the improvement comprising a lint filtering device disposed in the chamber for treating a textile fabric web, including a component for drying and/or fixing the fabric web, means for circulating air in a heated air stream flowing from the fabric web to said component, a filter screen having a given hole size for protecting said component from lint and other deposits, said filter screen being disposed substantially horizontally in an operating position in said air stream from which said filter screen can be horizontally removed and cleaned, a protective screen having substantially said given hole size, and means for holding said protective screen substantially horizontally in place downstream of said filter screen and upstream of said component to be protected in flow direction of said air stream during normal operation of the machine.

5. Device according to claim 4, wherein said component is a heat exchanger.

6. Device according to claim 4, wherein said component is a heating chamber.

* * * * *